May 1, 1962
E. R. PRICE ET AL
3,032,064
POPPET VALVE CONSTRUCTION
Filed Oct. 30, 1959
2 Sheets-Sheet 1
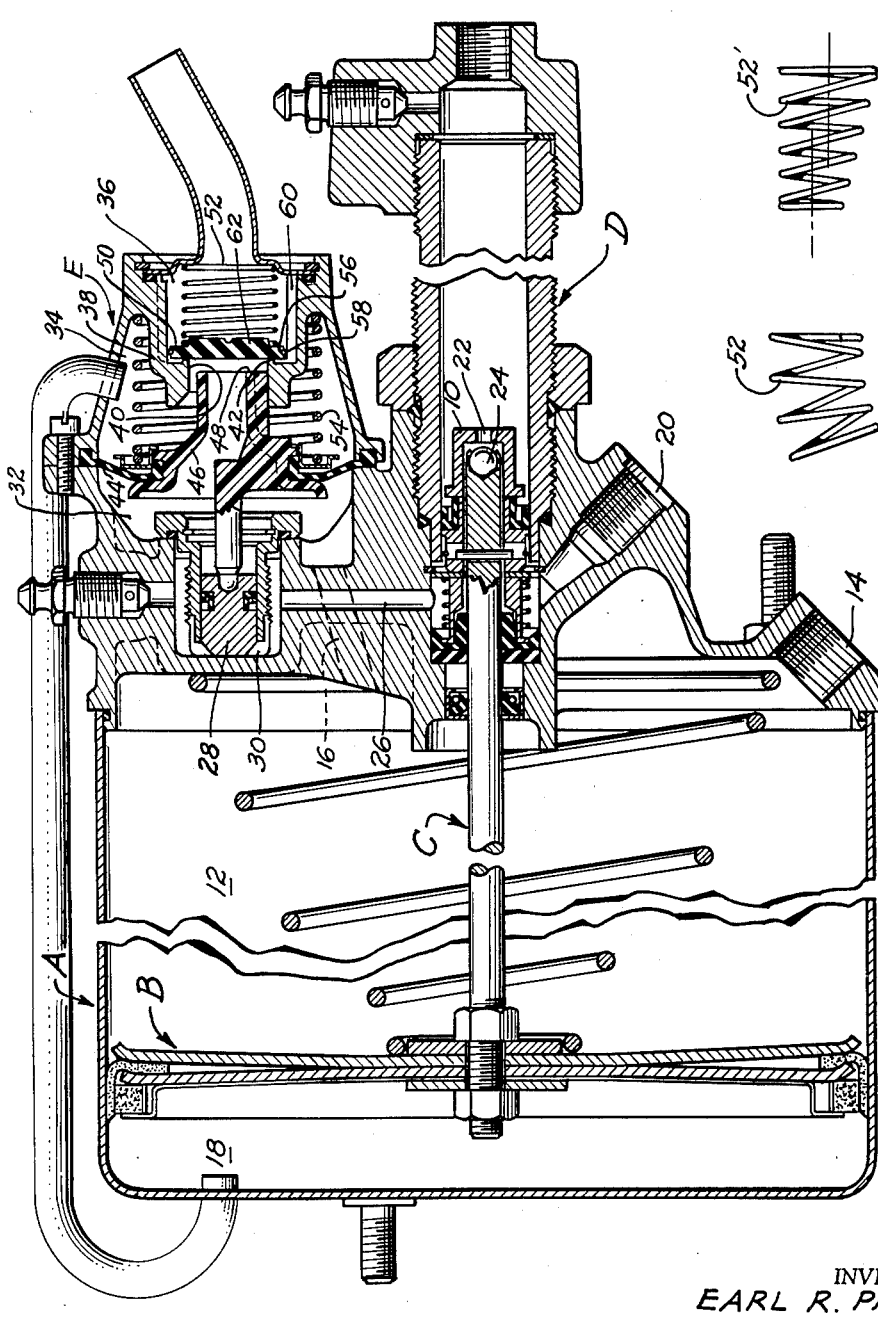
INVENTOR.
EARL R. PRICE
JOHN W. BLAIR.
MARVIN L. DAVIS.
BY *William P. Hickey*
ATTORNEY.

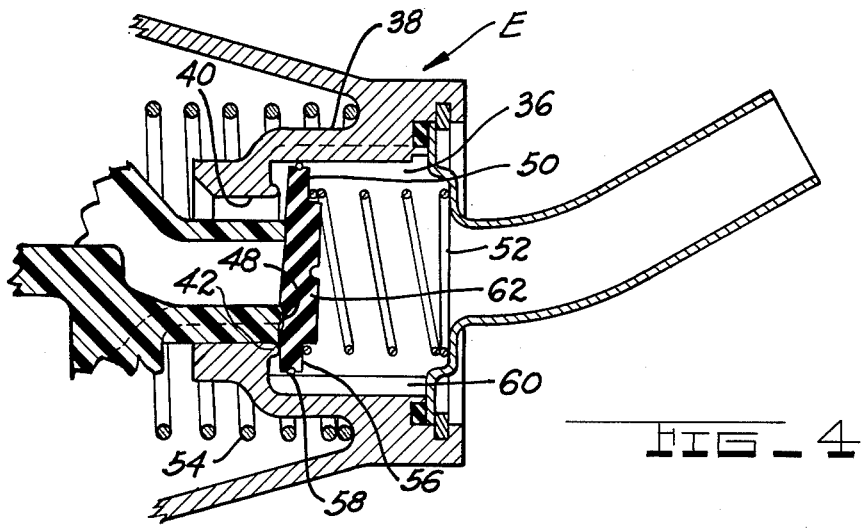
FIG_4

United States Patent Office 3,032,064
Patented May 1, 1962

3,032,064
POPPET VALVE CONSTRUCTION
Earl R. Price, John W. Blair, and Marvin L. Davis, South Bend, Ind., assignors to The Bendix Corporation, a corporation of Delaware
Filed Oct. 30, 1959, Ser. No. 849,967
11 Claims. (Cl. 137—620)

The present invention relates to an improved type of poppet valve construction; and more particularly to a poppet valve construction for use in the control valves of fluid pressure servomotors and the like.

An object of the present invention is the provision of a new and improved type of poppet valve construction wherein a type of hold down spring is used for the poppet which applies a greater force to one side of the poppet than is applied to the opposite side of the poppet, and wherein the actuating force for the poppet is applied between the centerline of force for the spring and said opposite side of the poppet to lift the poppet from its seat in a tilting action.

A more particular object of the present invention is the provision of a new and improved type of control valve poppet construction wherein a pair of concentric valve seats are provided by a fixed member and by the end of a relatively movable tubular member respectively for respective engagement with a poppet member, and wherein a poppet hold down spring is used—which spring is formed in such a manner as to provide a line of force which is eccentric with respect to the axis of the valve but which falls within the closed area of the smaller of the two seats, and which poppet member is made of a sufficient thickness of resilient material to permit the unbalanced hold down and actuating forces to tilt the poppet angularly from its seats during actuation.

A further object of the present invention is the provision of a simplified type of poppet construction particularly adaptable for use in the above described type of valve structure which can be made of a single block of nonreinforced rubberlike material that is simply guided relative to its seats by means of a wire snap ring seated in a peripheral groove in the block of rubberlike material— which wire rests on and is centered by at least three generally axially extending guiding surfaces supported by the surrounding structure of the valve.

A still further object of the present invention is the provision of a new and improved type of poppet construction of the above described type wherein the simplified poppet member is placed in the above described control valve structure and is biased against its seats by means of a spring having a substantially complete end coil abutting the block of rubber material in the region generally overlying the concentric valve seats.

A still more detailed object of the present invention is the provision of a new and improved type of control valve structure of the immediately above described type wherein the block of rubber material forming the poppet includes an axially extending projection on its side opposite to and generally overlying the smaller of the two valve seats to stiffen the poppet member and center the end coil of the hold down spring upon the poppet member.

The invention resides in certain constructions and combinations and arrangements of parts; and further objects and advantages will become apparent to those skilled in the art to which the invention relates from the following description of the several preferred embodiments described with reference to the accompanying drawing forming a part of this specification, and in which:

FIGURE 1 is a cross sectional view of a servomotor driven fluid pressure intensifying unit of the type used to power actuate the hydraulic brakes of automotive vehicles;

FIGURE 2 is a side elevational view of one type of "cockeyed" poppet hold down spring which may be used in the present invention;

FIGURE 3 is a side elevational view of another type of "cockeyed" poppet hold down spring which can be used in the present invention.

Although the invention may be otherwise embodied, it is herein shown and described as embodied in a vacuum powered servomotor driven hydraulic pressure intensifying unit of the type used to increase the pressure in the hydraulic braking system of an automotive vehicle. The construction and operation of the general type of unit shown in the drawing is explained in the Earl R. Price Patent No. 2,654,224; and in order that a sufficient understanding of the environment of the present invention can be had without reference to that patent, a short general description of its overall construction and operation will now be given.

The unit shown in the drawing generally comprises a vacuum actuated servomotor A having a movable wall or power piston B therein which pushes a piston rod C into a hydraulic chamber D. The end of the piston rod C projects into a cup shaped piston head 10 which is in turn forced into the hydraulic chamber D to displace fluid under pressure therefrom into the braking system of an automotive vehicle. The servomotor unit A shown in the drawing is of the vacuum submerged type. Vacuum is continually communicated to the front power chamber 12 on the front side of the power piston B through the vacuum inlet connection 14, and is thence communicated through cast passageway 16 to the control valve E of the servomotor—which control valve in its normal or deenergized condition is open to communicate the vacuum with the rear power chamber 18 on the opposite side of the power piston B by a suitable connection 19.

In the normal deenergized condition of the unit shown in the drawing, hydraulic pressure from the vehicle's master cylinder enters through the hydraulic inlet 20 to the back side of the cup shaped piston head 10, and thence flows around the end of the piston rod C into the cup shaped piston head 10 and out through a hole 22 in the end of the cup to proceed directly to the driven portion of the braking system. The end of the piston rod C carries a ball 24; and when the servomotor A is actuated, the power piston B forces the ball 24 into engagement with the end surface of the cup shaped piston head 10 over the opening 22 to seal off the opening 22 and drive the piston head 10 into the hydraulic chamber D. A complete explanation of the construction and operation of the hydraulic cylinder D can be had by referring to the above mentioned Earl R. Price patent. Pressure from the hydraulic inlet 20 is also continually communicated through a passageway 26 to the rear side of a valve actuating piston 28 that is slidingly received in a suitable hydraulic cylinder 30, positioned on the rear side of the control valve E.

The control valve E is provided with a vacuum chamber 32, a control chamber 34, and an atmospheric chamber 36 spaced apart in that order forwardly of the valve actuating piston 28. The atmospheric and control chambers 36 and 34 respectively are separated by means of a rigid partition wall 38 having an atmospheric valve port 40 that is coaxial with the hydraulic piston 28. An annular projection is provided on the partition 38 around the atmospheric valve port 40—which projection faces the atmospheric valve chamber 36. The vacuum valve chamber 32 and control valve chamber 34 are separated by means of a flexible reaction diaphragm 44, the center portion of which carries a suitable tubular projection for communicating vacuum from the chamber 32 to the control chamber 34, and the end of which terminates in a vacuum valve seat 48 that is positioned in the atmospheric valve port 40 generally concentric with the atmospheric valve seat 42. The center portion of the diaphragm 44 is suitably clamped to the tubular valve seat member 46, and the tubular valve seat member 46 is provided with a rearwardly extending axial projection which is received in the hydraulic valve actuating piston 28 for its actuation by the piston 28. A disc shaped poppet member 50 is normally held in engagement with the atmospheric valve seat 42 by poppet closure spring 52; and the end of the tubular vacuum valve seat member 46 is normally held out of engagement with the disc shaped poppet member 50 by means of a valve return spring 54—so that in the normal condition of the valve, vacuum is communicated to both sides of the power piston B to cause the power piston B to remain in its normal at rest position shown in the drawing.

In order to actuate the unit shown in the drawing, a build up in pressure in the hydraulic inlet port 20 from the master cylinder causes the valve actuating piston 28 to move the tubular vacuum valve seat member 46 into engagement with the disc shaped poppet member 50; whereupon further vacuum communication between the front power chamber 12 and the rear power chamber 18 is cut off. Continued movement of the tubular vacuum valve seat member 46 thereafter lifts the disc shaped poppet member 52 out of engagement with the atmospheric valve seat 42 to permit air to flow into the vacuum valve chamber 34, and thence to the rear power chamber 18 to drive the power piston B and hydraulic piston head 10 forwardly to displace hydraulic fluid pressure out of the hydraulic chamber D into the braking system of the vehicle. When a suitable braking effort is achieved, a further build up of pressure in the hydraulic inlet 20 is stopped; whereupon a further slight amount of air pressure is permitted to flow past the disc shaped poppet member 50 to increase the pressure differential upon the reaction diaphragm 44 by a sufficient amount to move the actuating piston 28 and tubular poppet member 46 rearwardly by an amount which again permits the poppet member 50 to abut the atmospheric valve seat 42. When this occurs, both the atmospheric valve seat 42 and vacuum valve seat 48 remain in tight sealing engagement with the disc shaped poppet member 50 to prevent further actuation of the unit.

When it is desired to release some of the pressure which is being developed by the unit, the pressure supplied to the inlet 20 is decreased; whereupon the pressure differential on the reaction diaphragm 44 causes the tubular vacuum valve seat member 46 and hydraulic actuating piston 28 to move rearwardly to bring the vacuum valve seat 48 out of engagement with the poppet 50 and thereby draw air out of the rear power chamber 18. Removal of air from the power chamber 18 will continue until such time as the differential pressure across the reaction diaphragm 44 has decreased to a point where it just balances the hydraulic actuating force being held upon the hydraulic actuating piston 28; whereupon the tubular vacuum valve seat member 46 moves forwardly into sealing engagement again with the poppet member 50. A complete release of actuating pressure in the hydraulic inlet 20 permits the actuating piston 28 and the tubular vacuum valve seat member 46 to move into the released position shown in the drawing, wherein the vacuum valve seat 48 is kept out of engagement with the disc shaped poppet member 50 to thereafter permit the power piston B and the hydraulic piston head 10 to return to the normal deenergized position shown in the drawing.

In order that the separation of the disc shaped poppet member 50 from the atmospheric valve seat 42 can be had smoothly with a minimum of actuating force, and in a manner which will accurately meter very small air flows, it is desired that the poppet member 50 be moved away from the atmospheric valve seat 42 by means of a tilting action. According to principles of the present invention, this tilting action is accomplished by forming the poppet closure spring 52 in a manner which produces a line or vector, of force upon the poppet 50 at a point which is off center to the line, or vector, of force of the actuating force applied by the tubular vacuum valve seat member 46; and by further forming the disc shaped poppet member 50 from a sufficient thickness of a resiliently deformable material such as rubber and the like, the eccentrically applied forces produce an uneven deformation of the poppet member which in turn causes the poppet member to lift in a tilting action from the atmospheric valve seat 42. In order that the disc shaped poppet member 50 will remain in sealing engagement with the end of the valve actuating tubular poppet member 46 while it is lifting the poppet member 50 out of engagement with the other of the valve seats, the line of force, or force vector of the spring 52 should fall within the area bounded by the end of the smaller of the two generally concentric valve seats. It will be understood that in some arrangements, the radially outer valve seat could be made the movable one and the smaller inside valve seat could be made the stationary one. It will be further understood that the position of the vacuum and atmospheric valve chambers can be reversed so that air pressure will normally flow through the tubular valve actuating member 46.

According to further principles of the present invention, the poppet member 50 is made very cheaply and simply from a single piece of resiliently deformable material, which in the present instance is a piece of neoprene rubber that has been premolded to provide an annular recess 56 in its radially outer periphery. A wire snap ring 58, the ends of which overlap, is positioned in groove 56 in such manner that the wire snap ring 58 projects out of the surface of the disc 50 to rest upon and slidingly engage at least three axially extending guide surfaces 60 that are integrally formed in the sidewalls of the atmospheric valve chamber 36. According to still further principles of the present invention, the end coil of the poppet closure spring 52 which abuts the disc 50 is substantially flat for 360° so as to offer a firm pressure upon the disc 50, and is further shaped so that it bears against the portion of the disc 50 in the area generally between and/or overlying the concentric valve seats 42 and 48. In the embodiment shown in the drawing, the end coil of the spring 52 is positioned over the larger or atmospheric valve seat 42, and the disc 50 is provided with an integrally formed boss 62 which extends over the vacuum valve seat 46 to stiffen the disc 50 and at the same time retain the end of the closure spring 50 in position opposite the vacuum valve seat 42.

The hold down spring 52 can be formed in several ways. In the embodiments shown in FIGURES 1 and 2 of the drawing, the individual coils of the spring are formed of the same diameter with the distance separating each of the coils along one side of the spring being less than that on the diametrically opposite side of the spring; so that the opposite end coils of the spring are at an angle with respect to each other in the normal uncompressed state of the spring. When the spring 52 is placed into position against the poppet member 50, the spring is sufficiently compressed so that the end coils of the springs are substantially parallel with each other; and in this state, it will be seen that a higher force is applied to one side of the poppet member 50 than is applied to the diametrically opposite side of the disc 50. The force applied by the spring upon the poppet member 50 may be thought of, therefore, as acting along a line of force, or force vector, which is closer to one side of the spring than it is with respect to the diametrically opposite side of the spring. In the embodiment of the spring shown in FIGURE 3 (and which has been designated 52'), the individual coils are spaced at the same distance apart, and are made of a progressively increasing diameter to make the center of the opposite end coils of the spring offset with respect to each other. It will be seen that this spring construction produces a line of force, or force vector, which is offset with respect to the center of either of its end coils. In certain instances it may also be possible to use a generally cylindrically shaped coil spring, having only a partial end coil for abutment with the rubber disc 50. Where such a construction is used, and the higher pressure is supplied to the smaller diameter valve seat, it will be seen that the rubber disc 50 would be blown away from the outer seat 42 so that it could never form a seal; and where such a spring having only a partial end coil is used, it may therefore be necessary to provide a stiffening ring either in the disc 50 or positioned between the disc 50 and the end of the coil spring 52.

While the invention has been described in considerable detail, we do not wish to be limited to the particular constructions shown and described; and it is our intention to cover hereby all novel adaptations, modifications and arrangements thereof which come within the practice of those skilled in the art to which the invention relates and which come within the purview of the following claims.

We claim:

1. In a control valve: a housing member including a valve seat, a poppet member for abutment with said seat, means for applying an actuating force to said poppet member on a line of force (or force vector) falling within the area bounded by said seat and in a manner permitting said poppet member to tilt relative to said valve seat, and a spring opposing actuating movement of said means and acting along another line of force (or force vector) falling within the area bounded by said seat but which is appreciably off center with respect to said actuating line of force.

2. In a control valve: a housing member having a generally symmetrically shaped valve seat that is generally normal to an imaginary axis passing through the imaginary geometric center point of said valve seat, a poppet member for abutment with said seat, means for applying an actuating force to said poppet member concentric with respect to said axis and in a manner permitting said poppet member to tilt relative to said valve seat, and a spring opposing actuating movement of said means and acting on said poppet member at an imaginary point appreciably off center with respect to said axis.

3. In a control valve and the like: first and second generally axially concentric and parallel valve seats for conducting pressure fluid therethrough, said second seat being movable generally axially relative to said first valve seat, a poppet member having a sealing surface for sealing abutment with said valve seats and upon which said pressure fluid produces pressure forces, and a spring biasing said poppet member against said seats, said spring acting on said poppet member along an imaginary line of force (or force vector) falling within the area bounded by the smaller of said valve seats but appreciably eccentric with respect to the axis of at least one of said valve seats, and said sealing surface of said poppet member being sufficiently resiliently deformable so that the eccentric pressure and spring forces acting on said poppet member cause a tilting action of said poppet member relative to said seats during actuation of said control valve.

4. In a control valve and the like: first and second generally axially concentric and parallel valve seats for conducting pressure fluid therethrough, said second seat being movable generally axially relative to said first valve seat, a poppet member having a sealing surface for sealing abutment with said valve seats and upon which said pressure fluid produces pressure forces, and a spring biasing said poppet member against said seats, said spring acting on said poppet member along an imaginary line of force (or force vector) falling within the area bounded by the smaller of said valve seats but appreciably eccentric with respect to the axis of at least one of said valve seats, and said sealing surface of said poppet member being sufficiently resiliently deformable so that the eccentric pressure and spring forces acting on said poppet member cause a tilting action of said poppet member relative to said seats during actuation of said control valve, said spring being a coil spring having coils of generally the same diameter with its opposite end coils being generally complete and lying in nonparallel planes.

5. In a control valve and the like: first and second generally axially concentric and parallel valve seats for conducting pressure fluid therethrough, said second seat being movable generally axially relative to said first valve seat, a poppet member having a sealing surface for sealing abutment with said valve seats and upon which said pressure fluid produces pressure forces, and a spring biasing said poppet member against said seats, said spring acting on said poppet member along an imaginary line of force (or force vector) falling within the area bounded by the smaller of said valve seats but appreciably eccentric with respect to the axis of at least one of said valve seats, and said sealing surface of said poppet member being sufficiently resiliently deformable so that the eccentric pressure and spring forces acting on said poppet member cause a tilting action of said poppet member relative to said seats during actuation of said control valve, said spring being a coil spring whose opposite end coils are off center with respect to each other.

6. In a control valve and the like: radially inner and radially outer generally axially concentric and parallel valves seats, one of said seats being movable generally axially relative to the other of said seats, a nonrigid disc of resilient rubberlike material guided for abutment by said seats, and a coil spring biasing said nonrigid disc against said seats, said coil spring having a substantially full end loop which is generally axially centered and bears against the side of said disc opposite to said seats in the annular region generally bounded by said valve seats, and said spring being so coiled as to provide a line of force (or force vector) falling within the area bounded by said radially inner valve seat and eccentric with respect to the axis of at least one of said seats.

7. In a control valve and the like: radially inner and radially outer generally axially concentric and parallel valve seats, one of said seats being movable generally axially relative to the other of said seats, a nonrigid disc of resilient rubberlike material guided for abutment by said seats, and a coil spring biasing said nonrigid disc against said seats, said coil spring having a substantially full end loop which is generally axially centered and bears against the side of said disc opposite to said seats in the annular region generally overlying said radially outer valve seat, and said spring being so coiled as to provide a line of force (or force vector) falling within the area bounded by said radially inner valve seat and eccentric with respect to the axis of at least one of said seats.

8. In a control valve and the like: radially inner and radially outer generally concentric and parallel valve seats, one of said seats being movable generally axially relative to the other of said seats, a nonrigid disc of resilient rubberlike material guided for abutment by said seats, and a coil spring biasing said nonrigid disc against said seats, said coil spring having a substantially full end loop which is generally axially centered and bears against the side of said disc opposite to said seats in the annular region generally bounded by said valve seats, said spring being so coiled as to provide a line of force (or force vector) falling within the area bounded by said radially inner valve seat and eccentric with respect to the axis of at least one of said seats, and said disc being provided with an integrally formed axially extending boss for locating said end loop and for stiffening said disc of rubberlike material.

9. A control valve structure and the like comprising: a housing having an axially extending port opening into an enlarged chamber, said housing having an annular concentric projection surrounding said port and facing into said chamber to provide a valve seat, a nonreinforced disc of resilient rubberlike material in said chamber generally centered with respect to and for abutment with said valve seat, said disc having an annular groove in its radially outer periphery, a wire snap ring of more than 360° in said groove, said housing having at least three longitudinally extending guide surfaces in said chamber on which said wire snap ring abuts for guiding and supporting said disc, an axially movable tubular fluid conducting member one end of which forms a valve seat which is generally centered in said port for abutment with said disc, and a coil spring biasing said disc against said seat, said coil spring having a substantially full end loop which is generally axially centered and bears against the side of said disc opposite to said seat in the region generally overlying said valve seats, said spring being so coiled as to provide a line of force (or force vector) falling within the area bounded by said radially inner valve seat and eccentric with respect to the centers of said valve seats, and said disc being provided with an integrally formed axially extending boss for locating said end loop and for stiffening said disc of rubberlike material.

10. A control valve structure and the like comprising: a housing having an axially extending port opening into an enlarged chamber, said housing having an annular concentric projection surrounding said port and facing into said chamber to provide a valve seat, a disc in said chamber generally centered with respect to and for abutment with said valve seat, said disc having an annular groove in its radially outer periphery, a wire snap ring in said groove, said housing having at least three longitudinally extending guide surfaces in said chamber on which said wire snap ring abuts for guiding and supporting said disc, an axially movable tubular fluid conducting member one end of which forms a valve seat which is generally centered in said port for abutment with said disc, and a coil spring biasing said disc against said seat.

11. A control valve structure and the like comprising: a housing having an axially extending port opening into an enlarged chamber, said housing having an annular concentric projection surrounding said port and facing into said chamber to provide a valve seat, a nonreinforced disc of resilient rubberlike material in said chamber generally centered with respect to and for abutment with said valve seat, said disc having an annular groove in its radially outer periphery, a wire snap ring of more than 360° in said groove, said housing having at least three longitudinally extending guide surfaces in said chamber on which said wire snap ring abuts for guiding and supporting said disc, an axially movable tubular fluid conducting member one end of which forms a valve seat which is generally centered in said port for abutment with said disc, and a coil spring biasing said disc against said seat.

References Cited in the file of this patent

UNITED STATES PATENTS

| | | |
|---|---|---|
| 2,393,524 | Fant | Jan. 22, 1946 |
| 2,526,236 | Ingres | Oct. 17, 1950 |
| 2,654,224 | Price | Oct. 6, 1953 |
| 2,797,665 | Chouings | July 2, 1957 |
| 2,910,051 | Hupp | Oct. 23, 1959 |